US010719380B2

(12) United States Patent
Miki et al.

(10) Patent No.: US 10,719,380 B2
(45) Date of Patent: Jul. 21, 2020

(54) OPERATION MANAGEMENT APPARATUS, OPERATION MANAGEMENT METHOD, AND STORAGE MEDIUM

(71) Applicant: NEC Corporation, Tokyo (JP)

(72) Inventors: Kiyokazu Miki, Tokyo (JP); Masanao Natsumeda, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 89 days.

(21) Appl. No.: 15/535,785

(22) PCT Filed: Dec. 17, 2015

(86) PCT No.: PCT/JP2015/006281
§ 371 (c)(1),
(2) Date: Jun. 14, 2017

(87) PCT Pub. No.: WO2016/103650
PCT Pub. Date: Jun. 30, 2016

(65) Prior Publication Data
US 2017/0351563 A1    Dec. 7, 2017

(30) Foreign Application Priority Data
Dec. 22, 2014  (JP) .................. 2014-259158

(51) Int. Cl.
G06F 11/00    (2006.01)
G06F 11/07    (2006.01)
(Continued)

(52) U.S. Cl.
CPC .......... G06F 11/0751 (2013.01); G05B 23/02 (2013.01); G05B 23/024 (2013.01);
(Continued)

(58) Field of Classification Search
CPC ............. G06F 11/0751; G06F 11/0736; G06F 11/0769; G06F 11/0775; G06F 11/34;
(Continued)

(56) References Cited

U.S. PATENT DOCUMENTS

2008/0010330 A1* 1/2008 Ide .................. G05B 23/024
708/201
2009/0217099 A1* 8/2009 Kato .................. G06F 11/3409
714/37
(Continued)

FOREIGN PATENT DOCUMENTS

EP    2750041 A1 * 7/2014 .......... G06F 11/3466
EP    2750041 A1    7/2014
(Continued)

OTHER PUBLICATIONS

Written Opinion of the International Searching Authority of PCT/JP2015/006281 dated Feb. 23, 2016.
(Continued)

Primary Examiner — Anthony J Amoroso
(74) Attorney, Agent, or Firm — Sughrue Mion, PLLC

(57) ABSTRACT

An operation management apparatus that is capable of detecting an anomaly is provided. The operation management apparatus is configured to execute processing of: acquiring a measured value for a performance indicator with regard to a monitored system, and detecting failure information indicating a failure with regard to a combination of two different performance indicators, by using a correlation model representing a relationship between the two different performance indicators; storing the detected failure information in time series; determining, based on the failure information, whether or not the failure information is continuously detected with regard to the combination including a particular performance indicator, and calculating an anomaly score representing degree of an anomaly with (Continued)

regard to the performance indicator, based on information about one or more second combinations among one or more first combinations, and information about the other combinations including the particular performance indicator; and providing the anomaly score being calculated.

18 Claims, 9 Drawing Sheets

(51) Int. Cl.
　　*G05B 23/02*　　(2006.01)
　　*G06F 11/34*　　(2006.01)
　　*G06F 11/30*　　(2006.01)
　　*G06N 5/04*　　(2006.01)

(52) U.S. Cl.
　　CPC ...... *G06F 11/0736* (2013.01); *G06F 11/0769* (2013.01); *G06F 11/0775* (2013.01); *G06F 11/3024* (2013.01); *G06F 11/3058* (2013.01); *G06F 11/34* (2013.01); *G06F 11/3409* (2013.01); *G06F 11/3447* (2013.01); *G06F 11/3452* (2013.01); *G06N 5/048* (2013.01)

(58) Field of Classification Search
　　CPC ............. G06F 11/3447; G06F 11/3452; G06F 11/3466; G06F 11/3024; G06F 11/3058; G06F 11/3409; G05B 23/02; G05B 23/024; G05B 23/0275; G05B 23/0281; G06N 5/048; G06N 5/046; G06N 5/047
　　See application file for complete search history.

(56) References Cited

U.S. PATENT DOCUMENTS

| | | |
|---|---|---|
| 2011/0225462 A1 | 9/2011 | Kato |
| 2012/0054554 A1 | 3/2012 | Dagan |
| 2012/0192014 A1 | 7/2012 | Kato |
| 2012/0278663 A1* | 11/2012 | Hasegawa ........... G06F 11/0709 714/47.1 |

FOREIGN PATENT DOCUMENTS

| | | |
|---|---|---|
| EP | 2808797 A1 | 12/2014 |
| JP | 2009-199533 A | 9/2009 |
| JP | 2011146073 A | 7/2011 |
| JP | 2012-108708 A | 6/2012 |
| JP | 5267684 B2 | 8/2013 |
| WO | 2013/027562 A1 | 2/2013 |
| WO | 2013/136739 A1 | 9/2013 |

OTHER PUBLICATIONS

International Search Report of PCT/JP2015/006281 dated Feb. 23, 2016.

Communication dated Jul. 24, 2018 from the European Patent Office in counterpart application No. 15872223.1.

\* cited by examiner

Fig. 3

| METRICS | FAILURE INFORMATION | | | | | | |
|---|---|---|---|---|---|---|---|
| | DETECTED TIME | | | | | | |
| | 1:00 | 1:10 | 1:20 | 1:30 | 1:40 | 1:50 | 2:00 |
| (1, 2) | no | no | yes | yes | no | yes | no |
| (1, 3) | no | no | yes | no | no | yes | no |
| (1, 4) | no | no | no | no | no | no | no |
| ... | ... | ... | ... | ... | ... | ... | ... | ically complicated systems (or compo-
OPERATION MANAGEMENT APPARATUS, OPERATION MANAGEMENT METHOD, AND STORAGE MEDIUM

CROSS REFERENCE TO RELATED APPLICATIONS

This application is a National Stage of International Application No. PCT/JP2015/006281 filed Dec. 17, 2015, claiming priority based on Japanese Patent Application No. 2014-259158 filed Dec. 22, 2014, the contents of all of which are incorporated herein by reference in their entirety.

TECHNICAL FIELD

The present invention relates to an operation management apparatus, an operation management method, an operation management program, and the like which are capable of detecting an anomaly occurring in an apparatus, a system, or the like to be monitored.

BACKGROUND ART

Importance of relatively complicated systems (or components constituting the systems), such as various plants and social infrastructures, have increases in recent years. These systems are required to be stably operated and managed. Accordingly, there is a demand for a technique capable of monitoring an operation status or an operating status of these systems and detecting an anomaly occurring in these systems.

With regard to the technique for detecting an anomaly in a system to be managed, following patent literatures are known.

In PTL 1 (Japanese Patent No. 5267684), a technique relating to an operation management apparatus and the like for monitoring an operating status of a system is described. An apparatus disclosed in PTL 1 acquires, from a plurality of monitored apparatuses, measured values of a plurality of performance indicators (metrics) and generates a correlation model for two different metrics. The apparatus detects an anomaly item, based on a result of a comparison between an estimated value for a certain metric, which is calculated by using the correlation model, and an observed value of the metric. The apparatus calculates, for each of the monitored apparatuses, an anomaly score by using a total number of combinations of two metrics and the number of the detected anomaly items, and specifies, as an anomaly source, a metric with the anomaly score being high. In the technique disclosed in PTL 1, common anomaly items are excluded in the plurality of monitored apparatuses present in the same layer, thereby eliminating an effect caused by extension of an anomaly between layers.

In PTL 2 (Japanese Unexamined Patent Application Publication No. 2009-199533) a technique relating to an operation management apparatus and the like for detecting a sign of occurrence of a failure and specifying an occurrence point of the failure is described. The apparatus disclosed in PTL 2 acquires, from a plurality of monitored apparatuses, a plurality of pieces of performance information (corresponding to the above-mentioned metrics), and generates a correlation model representing a correlation function for two different pieces of performance information. The apparatus uses the correlation model to determine whether or not newly detected performance information destroys the correlation. The apparatus calculates an anomaly score, based on the determination result, thereby analyzing occurrence of the anomaly. The apparatus deletes a correlation model representing the correlation, when the correlation is steadily destroyed.

In PTL 3 (International Publication No. 2013/027562), a technique relating to an operation management apparatus and the like for detecting occurrence of a failure in a system is described. The apparatus disclosed in PTL 3 generates a correlation model related to a performance indicator (metric) of a monitored apparatus (a monitored system) and detects an anomaly (state) in the correlation, similarly to the above-mentioned patent literatures. The apparatus calculates an anomaly score, based on the detected anomaly in the correlation and a degree of continuation of the anomaly. In the technique disclosed in PTL 3, a performance indicator with a high anomaly score (i.e., the degree of anomaly is large, or the degree of continuation of anomaly is large) is specified to analyze the anomaly occurring in the system.

In PTL 4 (International Publication No. 2013/136739) a technique relating to an operation management apparatus and the like for detecting occurrence of a failure in a system is described. The apparatus disclosed in PTL 4 generates a correlation model related to a performance indicator (metric) of a monitored apparatus (a monitored system) and detects an anomaly (state) in the correlation, similarly to the above-mentioned patent literatures. Upon detecting a change in a configuration of the system, the apparatus regenerates a correlation model, based on a measured value of a metric obtained after the configuration is changed. The apparatus changes a pattern for detecting destruction of the correlation in accordance with the changed configuration. Thus, the technique disclosed in PTL 4 enables to appropriately analyze a failure occurring in a monitored apparatus (a monitored system) even when a change occurs in a configuration of the system.

CITATION LIST

Patent Literature

[PTL1] Japanese Patent No. 5267684
[PTL2] Japanese Unexamined Patent Application Publication No. 2009-199533
[PTL3] International Publication No. WO2013/027562
[PTL4] International Publication No. WO2013/136739

SUMMARY OF INVENTION

Technical Problem

Assuming a case where an operation management apparatus detects occurrence of an anomaly in a monitored apparatus (or a monitored system) by using a performance indicator (or a combination thereof) acquired from the monitored apparatus. In this case, an anomaly state may be continuously (or steadily) detected for a particular performance indicator (or a combination thereof). For example, when a status (state) of the system on creation of a correlation model related to the particular performance indicator differs from a status (state) of the system on applying the correlation model, an anomaly state may be continuously detected even when the status of the system to which the correlation model is applied is normal.

Also under such a status, the operation management apparatus is expected to be able to determine whether or not an anomaly is actually occurring in a monitored apparatus, for example, when a state of the monitored apparatus has changed from a normal state to an anomaly state. The operation management apparatus is also expected to be able to specify an anomaly part even under such a status.

On the other hand, the above-mentioned PTL 1 describes only a technique for calculating an anomaly score related to a particular performance indicator (or a combination thereof) at a particular time point. Specifically, in the technique disclosed in PTL 1, a temporal change related to a performance indicator in relation to which an anomaly is occurring is not taken into consideration. Thus, in the technique disclosed in PTL 1, there is a possibility that, when a particular performance indicator (or a combination thereof) steadily indicates an anomaly state, it is not able to determine accrately whether an anomaly related to the performance indicator is actually occurring.

The above-mentioned PTL 2 describes a technique for, when a steady anomaly state is detected (when a correlation is steadily destroyed in the above-mentioned PTL 2), deleting a correlation model related to the correlation. Accordingly, in the technique disclosed in PTL 2, there is a possibility that, when an anomaly related to a performance indicator with regard to the deleted correlation model is actually occurring, the anomaly is not detected.

The above-mentioned PTL 3 describes a technique that focuses on a degree of continuation of an anomaly detected in relation to a certain performance indicator when an anomaly score is calculated. However, in the technique disclosed in PTL 3, when a certain performance indicator continuously indicates an anomaly, it may be determined that the anomaly score is large, regardless of whether an anomaly related to the performance indicator is actually occurring.

The technique disclosed in PTL 4 is a technique for changing a correlation model or the like used for detecting an anomaly in accordance with a change in a configuration of a monitored apparatus. It is difficult to apply this technique to an analysis of an anomaly state continuously detected.

The present invention has been made in view of the above-mentioned circumstances. That is, a main object of the present invention is to provide an operation management apparatus and the like that provide information capable of determining whether or not an anomaly (failure) is actually occurring in a situation where a particular anomaly (failure) state related to a monitored system is continuously detected.

Solution to Problem

To achieve above described objectives, an operation management apparatus according to one aspect of the present invention includes following configurations. That is, the operation management apparatus comprising a processing circuitry configured to execute: processing of acquiring one or more measured values for a performance indicator with regard to a monitored system, and detecting failure information indicating a failure with regard to a combination of two different performance indicators, based on the measured values being acquired, by using a correlation model representing a relationship between the two different performance indicators; processing of storing the detected failure information in time series in a memory device; processing of determining, based on the failure information stored in the memory device, whether or not the failure information is continuously detected with regard to the combination including a particular performance indicator, and calculating an anomaly score representing degree of an anomaly with regard to the performance indicator, based on information about one or more second combinations among one or more first combinations, and information about the other combinations including the particular performance indicator, the first combination being the combination which includes the particular performance indicator and for which the failure information is detected, the second combination being the combination for which the failure information is determined to be continuously detected; and processing of providing the anomaly score being calculated.

An operation management method according to one aspect of the present invention is configured as follows. That is, the operation management method according to one aspect of the present invention includes, by an information processing apparatus, acquiring one or more measured values for a performance indicator with regard to a monitored system; detecting failure information indicating a failure with regard a combination of two different performance indicators, based on the measured values being acquired, by using a correlation model representing a relationship between the two different performance indicators; storing the detected failure information in time series; determining, based on the stored failure information, whether or not the failure information is continuously detected for the combination including a particular performance indicator; and calculating an anomaly score representing degree of an anomaly with regard to the performance indicator, based on information about one or more second combinations among one or more first combinations, and information about the other combinations including the particular performance indicator, the first combination being the combination which includes the particular performance indicator and for which the failure information is detected, the second combination being the combination for which the failure information is determined to be continuously detected.

The above-mentioned object may also be achieved by a computer program for causing a computer to implement the operation management apparatus having the configuration described above and the operation management method corresponding to the operation management apparatus, a computer-readable storage medium storing the computer program, and the like.

Advantageous Effects of Invention

According to the present invention, it is possible to provide information that can be used to determine whether or not an anomaly (failure) is actually occurring in a situation where a particular anomaly (failure) state related to a monitored system is continuously detected.

BRIEF DESCRIPTION OF DRAWINGS

FIG. 3 is a diagram illustrating a specific example of failure information in the first example embodiment of the present invention;

DESCRIPTION OF EMBODIMENTS

Next, example embodiments for realizing the present invention will be described in detail with reference to the drawings. Configurations described in the following example embodiments are one of specific examples, and the technical scope of the present invention is not limited to these examples.

An operation management apparatus described in each of the following example embodiments may be implemented as a dedicated hardware apparatus or a system including combination of dedicated hardware apparatuses. The operation management apparatus may be implemented as one or more physical information processing apparatuses or virtual information processing apparatuses, or a system configured using a combination thereof. An example of hardware configuration (FIG. 9) of an information processing apparatus that implements the operation management apparatus will be described later.

When the operation management apparatus is implemented using a plurality of various hardware apparatuses or a plurality of information processing apparatuses which are physically or logically separated from each other, the components of the apparatuses may be communicatively connected to each other using a wireless or wired communication network, or a combination of wireless and wired communication networks. When the operation management apparatus is implemented using a virtual information processing apparatus, the above-mentioned communication network may be configured as a virtual communication network.

In the following description, objects for detecting occurrence of a failure (anomaly) by the operation management apparatus in each example embodiment are collectively referred to as "a monitored apparatus". The monitored apparatus may be a single apparatus, or a system (monitored system) configured as a combination of a plurality of apparatuses.

First Example Embodiment

A first example embodiment of the present invention will be described below.

Description of Configuration

Figure 1:
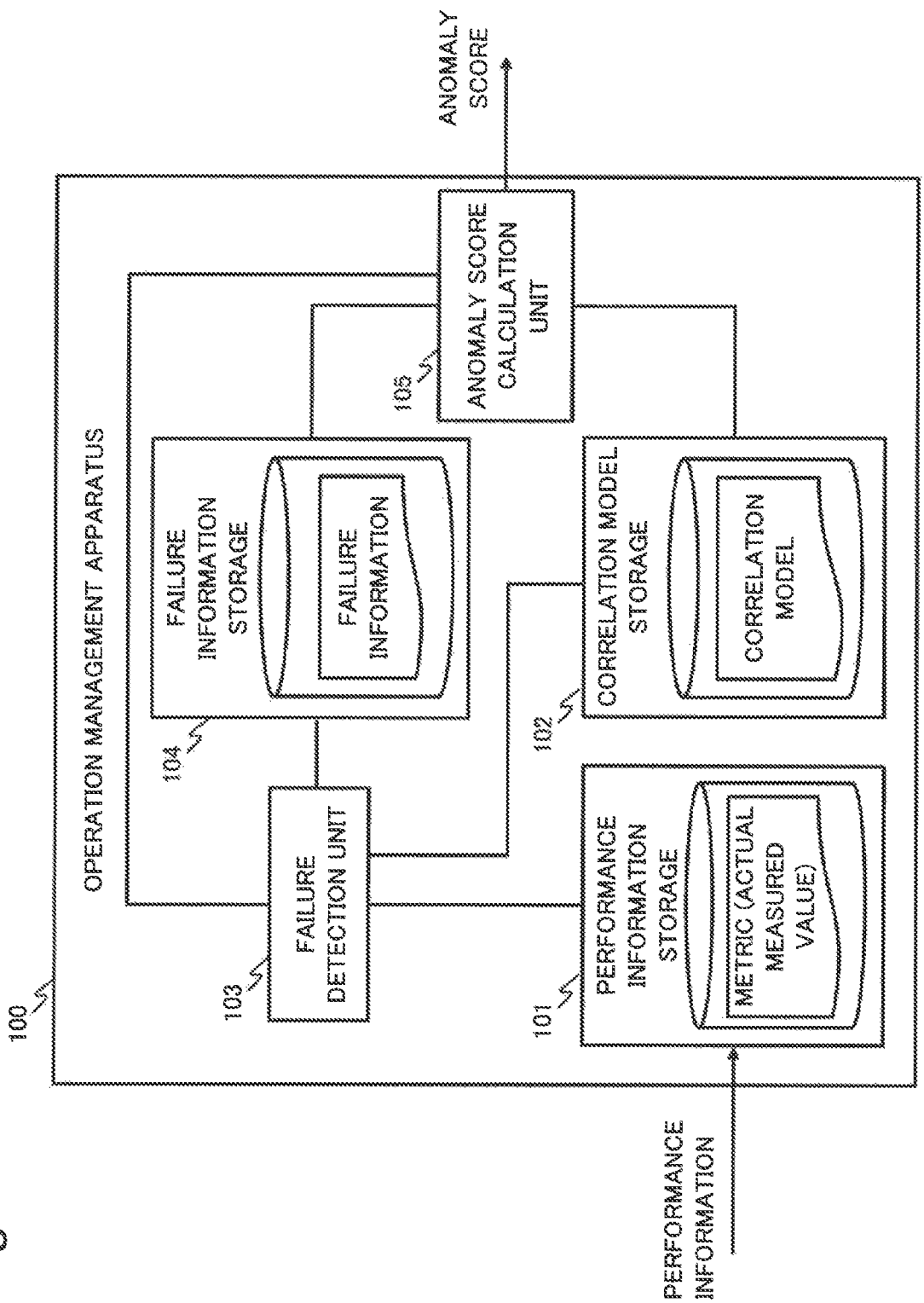
FIG. 1 is a block diagram illustrating a functional configuration of an operation management apparatus according to a first example embodiment of the present invention.

A configuration of an operation management apparatus according to the first example embodiment of the present invention will be described with reference to FIG. 1. FIG. 1 is a block diagram illustrating a functional configuration of an operation management apparatus 100 according to this example embodiment.

Referring to FIG. 1, the operation management apparatus 100 according to the first example embodiment of the present invention includes a performance information storage 101, a correlation model storage 102, a failure detection unit 103, a failure information storage 104, and an anomaly score calculation unit 105.

The operation management apparatus 100 may be implemented using various information processing apparatuses including, for example, a CPU (Central Processing Unit). Hardware configurations which can implement the operation management apparatus 100 will be described later.

In the configuration illustrated in FIG. 1, the operation management apparatus 100 is configured as a single apparatus including the components (the performance information storage 101, the correlation model storage 102, the failure detection unit 103, the failure information storage 104, and the anomaly score calculation unit 105). The present invention is not limited to this configuration. The components configuring the operation management apparatus 100 may be individually implemented using a plurality of physical apparatuses or virtual apparatuses which are physically or logically separated from each other.

The components constituting the operation management apparatus 100 will be described below.

The performance information storage 101 stores, for example, values (measured value, observed value) for a performance indicator (metric) related to a monitored apparatus that are obtained from various sensors and the like. The sensors may be provided inside the monitored apparatus. Further, the sensors may acquire various pieces of information about the monitored apparatus from the outside of the monitored apparatus. The sensors can measure, as the performance indicator (metric), appropriate information such as information about the temperature, a load state, throughput per unit time, and a remaining capacity of a memory, of the monitored apparatus.

The performance information storage 101 may store, as time-series data, a value of a certain performance indicator and a time when the performance indicator is measured, by associating the value of the performance indicator and the time with each other.

The performance information storage 101 is able to supply the failure detection unit 103, which is described later, with a metric obtained in a predetermined time, or time-series data related to the metric.

The correlation model storage 102 stores a correlation model. The correlation model storage 102 is able to supply the failure detection unit 103 and the anomaly score calculation unit 105 with the correlation model.

The correlation model is a model representing a relationship between various combinations of two performance indicators (metrics). The operation management apparatus 100 (in particular, the failure detection unit 103 described later) can estimate (calculate), from the value of one metric, the value of the other metric by using the correlation model. More specifically, the correlation model can be implemented using, for example, a conversion function representing a correlation between two metrics. In this case, based on the value (measured value) of one of two metrics, an estimated value for the value of the other metric is calculated using the conversion function. The correlation model can be generated by using, for example, the technique described in Japanese Unexamined Patent Application Publication No. 2009-199533. The correlation model in this example embodiment may include a plurality of pieces of information (e.g., the above-mentioned correlation function etc.) indicating a combination of two metrics and a relationship between the two metrics included in the combination. In the following description, a combination of two metrics may be referred to simply as "a metric combination". The correlation model may be supplied to the correlation model storage 102 in advance.

The failure detection unit 103 reads, from the performance information storage 101, the value (observed value) of the performance indicator (metric) collected at a predetermined time. Specifically, the failure detection unit 103 may acquire the value of the metric supplied from the performance information storage 101, and may read the value of the metric stored in the performance information storage 101. Further, the failure detection unit 103 reads the correlation model from the correlation model storage 102. Specifically, the failure detection unit 103 may acquire the correlation model supplied from the correlation model storage 102, and may read the correlation model stored in the correlation model storage 102.

The failure detection unit 103 detects failure information about the combination of two metrics included in the above-mentioned correlation model by using the value (observed value) of the performance indicator (metric) read from the above-mentioned performance information storage 101. The failure information is information which can be used to determine whether or not a failure (anomaly) has occurred in relation to the metric combination.

Specifically, the failure detection unit 103 calculates, using the value (observed value) of one metric (first metric (first performance indicator)) in the combination of two metrics, an estimated value for the other metric (second metric (second performance indicator)). Further, the failure detection unit 103 calculates a difference between the estimated value for the second metric and the observed value for the second metric read from the performance information storage 101. In addition, the failure detection unit 103 may calculate a value proportional to the difference between the estimated value for the second metric and the observed value for the second metric read from the performance information storage 101. The value proportional to the difference may be calculated by performing arithmetic processing (calculation etc.), as needed, on the calculated difference. In the following description, the above-mentioned difference and the value proportional to the difference are collectively referred to as a "difference or the like".

When the calculated difference or the like exceeds a predetermined value (reference value), the failure detection unit 103 detects failure information about the metric combination. In this case, the failure detection unit 103 may detect failure information for each metric (performance indicator) included in the metric combination.

The failure information storage 104 stores the failure information detected by the failure detection unit 103. The failure information storage 104 may store, as time-series data, the failure information and a time when the failure information is recorded, by associating the failure information with the time. Specifically, the failure information storage 104 may record (store), for each of one or more combinations of two metrics included in the correlation model, information indicating whether a failure is detected at each time (whether or not the difference between the observed value and the estimated value is equal to or greater than a predetermined value). The failure information storage 104 may store time-series data of the failure information, for example, in a format as illustrated in FIG. 3. The failure information storage 104 is not limited to the format illustrated in FIG. 3, and may store the failure information (or time-series data of failure information) in any other appropriate format.

The anomaly score calculation unit 105 calculates an anomaly score representing a degree of anomaly related to each metric for each metric included in the combination of two metrics in relation to which a failure is detected. The anomaly score represents the degree of failure (anomaly) which may have occurred in the monitored apparatus in which the observed value of the metric is acquired.

The anomaly score calculation unit 105 receives the failure information from the failure detection unit 103. The anomaly score calculation unit 105 counts the number of detected failures (anomalies) for each metric according to the combination of two metrics (first combination) in which a failure is detected. In this case, the anomaly score calculation unit 105 may count the value proportional to the number of detected failures (anomalies). The value proportional to the number of detected failures (anomalies) may be calculated by performing arithmetic processing (calculation etc.) on the number of detected failures (anomalies). Hereinafter, the number of detected failures (anomalies) and the value proportional to the number of detected failures (anomalies) are collectively referred to as an "anomaly detection number".

The anomaly score calculation unit 105 may count, for the combination of two metrics in which the failure is detected, the anomaly detection number in such a manner that, for example, the anomaly detection number is proportional to the number of detected failures for each metric. The anomaly score calculation unit 105 may simply use, for example, the number of times of detection as the anomaly detection number. As one specific example, assuming a case that a failure is detected for each of a combination of a metric 1 and a metric 2 and a combination of the metric 1 and a metric 3. The metrics 1 to 3 may be performance indicators (metrics) related to any measures to be monitored apparatus and the like. In this case, the anomaly score calculation unit 105 counts (calculates) the anomaly detection number, for example, assuming that the anomaly detection number for the metric 1 is "2" and the anomaly detection number for each of the metric 2 and the metric 3 is "1". The method for calculating the anomaly detection number is not limited to the above method, and the anomaly score calculation unit 105 may calculate the anomaly detection number based on, for example, a degree of detected anomaly (a degree of deviation from the correlation model). Further, the anomaly score calculation unit 105 may calculate the anomaly detection number by using a calculation method, for example, to slow down anomaly detection number in accordance with an increase in the detection number, such as a log.

The anomaly score calculation unit 105 according to this example embodiment refers to the time-series data of the failure information stored in the failure information storage 104, when calculating the anomaly detection number. The anomaly score calculation unit 105 determines whether the failure is continuously detected for a particular combination of two metrics based on time-series data of failure information. The anomaly score calculation unit 105 excludes, from the count of the anomaly detection number, a combination of two metrics (second combination) in which a failure is determined to be continuously detected. Specifically, the anomaly score calculation unit 105 acquires (calculates) the anomaly detection number after excluding the combination of metric (second combination) in which the failure is continuously detected from the combination of metric (first combination) in which the failure is detected. Thus, the anomaly score calculation unit 105 is able to implement failure (anomaly) detection processing for detecting sensitively a change of the system from the normal state to the anomaly state.

Specifically, for example, when the number of detected failures is "m" in past "n" points ("n" points of times of measurement in time-series data) from a certain particular point, the anomaly score calculation unit 105 may calculate the anomaly detection ratio (broken ratio) by using the following calculation equation. In the following equation (1), a sign "/" denotes a division.

Broken ratio=$m/n$ (Equation 1)

When the above-mentioned broken ratio related to a particular combination of two metrics exceeds a predetermined reference value, the anomaly score calculation unit 105 may handle the particular combination in such a manner that the particular combination is excluded from the anomaly detection number. In other words, in this case, the anomaly score calculation unit 105 determines whether the failure is continuously occurring based on the ratio between detected failures in the past "n" points of time.

The determination method is not limited to the above, but instead the anomaly score calculation unit 105 may evaluate a temporal continuity of the detected failure. The temporal continuity of the failure refers to, for example, a degree of continuation of the failure detected for a particular combination of metrics. Specifically, the anomaly score calculation unit 105 may calculate the broken ratio by the following equation, by using "p" representing a count of continuously detected failures at a point that is temporally closest to a particular point of time, in the past "n" points o time from the particular point of time (instead of using a total number of detected failures).

Broken ratio=$p/n$ (Equation 2)

Without limited to above, the anomaly score calculation unit 105 may use, as "p", the number of continuously detected failures in an appropriate period (second period) included in the "n" points of time from a particular point (first period).

In addition, the anomaly score calculation unit 105 receives the correlation model from the correlation model storage 102. The anomaly score calculation unit 105 acquires (calculates), for each metric, the total number of combinations of two metrics included in the above-mentioned correlation model including the metric, as the number of correlation model with regard to the metric. As a specific example, assuming a case that the correlation model includes a combination of the metric 1 and the metric 2, a combination of the metric 1 and the metric 3, and a combination of the metric 1 and a metric 4. In this case, the anomaly score calculation unit 105 calculates the number of correlation model related to the metric 1 as "3". That is, the number of correlation model with regard to a particular metric represents a total number of combinations of two or more metrics including the particular metric.

The anomaly score calculation unit 105 calculates, as an anomaly score, a ratio of the anomaly detection number to the number of correlation model. For example, when the number of correlation model is "20" and the anomaly detection number is "7", the anomaly score calculation unit 105 calculates "0.35" as the anomaly score.

The components configuring the operation management apparatus 100 realizes a function to detect an anomaly in a monitored apparatus by evaluating a temporal change in the state of the monitored apparatus. Thus, the operation management apparatus 100 is able to detect the anomaly in the monitored apparatus, even in a case that the anomaly state is steadily detected, regardless of whether the anomaly is actually occurring with regard to a particular combination of performance indicators (metrics). That is, when a state indicating a detection result related to a particular combination of performance indicators (metrics) is changed from the normal state to the anomaly state, the operation management apparatus 100 is able to detect occurrence of the failure (anomaly) in the monitored apparatus. Further, the operation management apparatus 100 is able to specify appropriately a part where the failure (anomaly) has occurred.

Description of Operation

Figure 2:
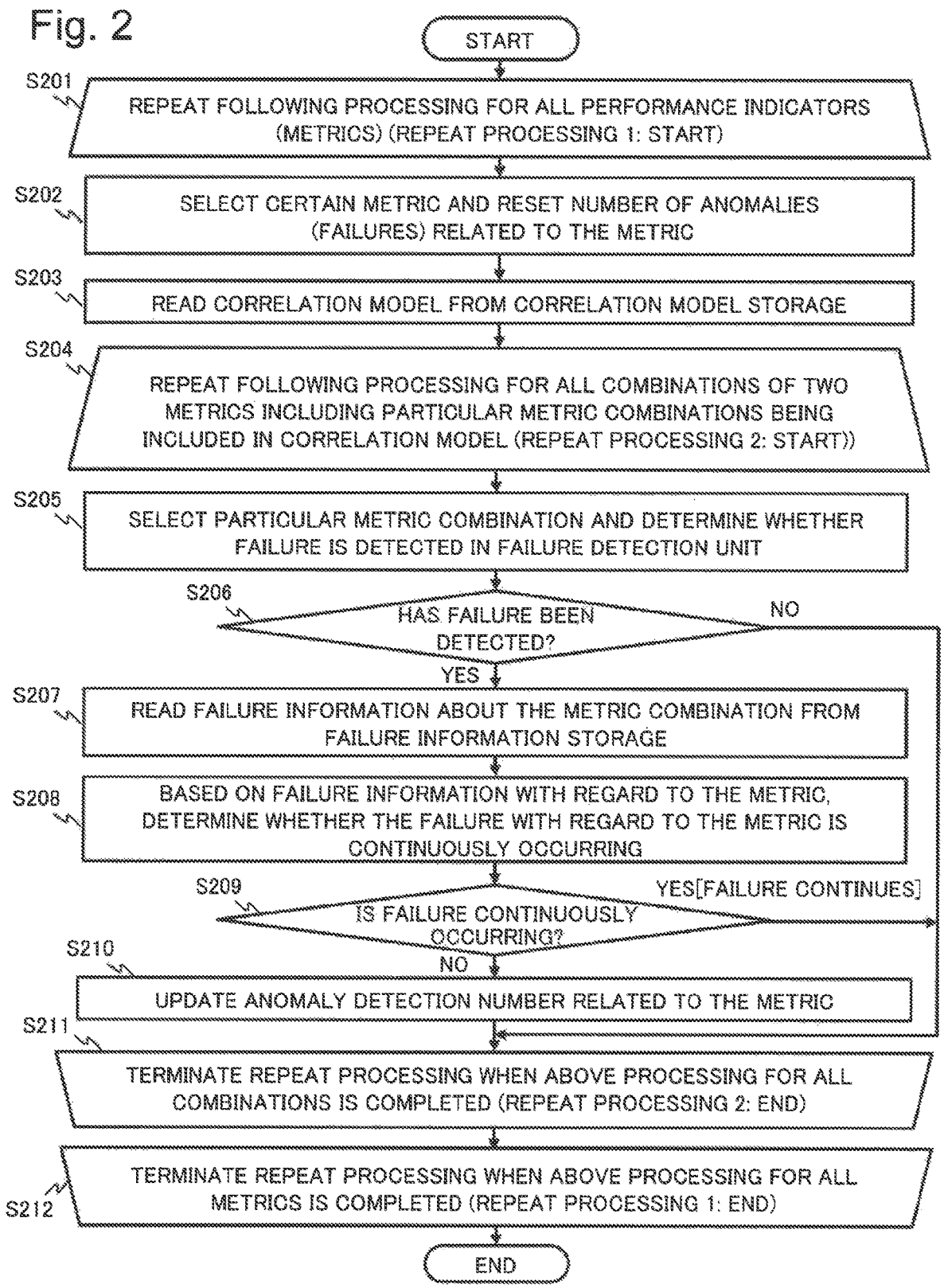
FIG. 2 is a flowchart illustrating an operation of the operation management apparatus according to the first example embodiment of the present invention.

Next, an operation of the operation management apparatus 100 according to this example embodiment will be described in detail with reference to FIG. 2. FIG. 2 is a flowchart illustrating an operation of the operation management apparatus 100 according to this example embodiment. Note that in the following description, the operation (in particular, processing for calculating the anomaly detection number) of the anomaly score calculation unit 105, which is a major component of the operation management apparatus 100, will be mainly described.

First, the anomaly score calculation unit 105 repeats processing of steps S202 to S211 for all metrics related to the monitored apparatus (steps S201 to S212). The anomaly score calculation unit 105 may refer to all metrics related to the monitored apparatus respectively, by referring to, for example, the metrics stored in the performance information storage 101. Further, information about all metrics related to the monitored apparatus may be preliminarily set to the anomaly score calculation unit 105.

Next, the anomaly score calculation unit 105 selects a particular metric among all the metrics related to the monitored apparatus. Further, the anomaly score calculation unit 105 resets (initializes) the anomaly detection number for the selected metric to "0 (zero)" (step S202).

Next, the anomaly score calculation unit 105 reads the correlation model from the correlation model storage 102 (step S203).

The anomaly score calculation unit 105 repeats processing of steps S205 to S210 for all combinations including the metric selected in step S202, among the combinations of two metrics included in the above-mentioned correlation model (steps S204 to S211).

The anomaly score calculation unit 105 selects a particular combination of two metrics including the metric selected in step S202. Then the anomaly score calculation unit 105 determines whether or not a failure related to the selected metric combination is detected, by using the information supplied from the failure detection unit 103 (step S205). The anomaly score calculation unit 105 may determine whether or not a failure related to the selected metric combination is detected, by referring to the failure information stored in the failure information storage 104.

As a result of the determination, when a failure related to the combination of two metrics selected in step S205 is detected (YES in step S206), the anomaly score calculation unit 105 executes processing of step S207 and subsequent steps. That is, the anomaly score calculation unit 105 reads the failure information about the combination of two metrics from the failure information storage 104 (step S207).

Next, the anomaly score calculation unit 105 determines whether a failure related to the selected metric combination is continuously detected, based on the failure information being read (step S208). Specifically, the anomaly score calculation unit 105 calculates a broken ratio from a failure detection number "m" in a past point "n" by using, for example, the above-mentioned Equation (1). Then, the anomaly score calculation unit 105 determines whether t the broken ratio is equal to or less than a predetermined threshold (reference value). When the a calculated broken ratio is equal to or less than the predetermined threshold, the anomaly score calculation unit 105 determines that the failure related to the selected metric combination is not continuously occurring.

As a result of processing in step S208, when it is determined that the failure related to the selected metric combination is not continuously occurring (NO in step S209), the anomaly score calculation unit 105 updates the anomaly detection number for the metric (step S210). In this case, the anomaly score calculation unit 105 may increase the anomaly detection number for the metric by "1".

When the result of step S206 indicates NO, or the result of step S209 indicates YES, the anomaly score calculation unit 105 returns to step S204 and repeats processing (repeat processing 2 in FIG. 2).

The anomaly score calculation unit 105 repeats processing of steps S205 to S210 for all combinations of two metrics including a certain metric (repeat processing 1 in FIG. 2) and calculates the anomaly detection number for the metric (step S211). After that, the anomaly score calculation unit 105 returns to step S201 and executes processing for the next metric (step S212).

Description of Advantageous Effects

In the following, advantageous effects provided by the operation management apparatus 100 according to this example embodiment will be described. The operation management apparatus 100 according to this example embodiment evaluates whether or not the failure is continuously occurring, by referring to the failure information storage 104, when the anomaly score calculation unit 105 calculates the anomaly score. That is, the operation management apparatus 100 according to this example embodiment is configured to detect an anomaly related to the monitored apparatus, by evaluating a temporal change in the state of the monitored apparatus.

With this configuration, the operation management apparatus 100 is able to detect the anomaly in the monitored apparatus, even in a case where the anomaly state is steadily detected regardless of whether the anomaly is actually occurring in a particular combination of performance indicators (metrics). More specifically, when a state detected for a particular combination of performance indicators (metrics) is changed from the normal state to the anomaly state, the operation management apparatus 100 is able to detect occurrence of the anomaly in the monitored apparatus and is able to specify appropriately an anomaly part. As described above, the operation management apparatus 100 according to this example embodiment is able to supply information capable of determining whether the anomaly (failure) is actually occurring in the monitored system in the situation where a particular anomaly (failure) state related to the monitored system is continuously detected.

The operation management apparatus 100 according to this example embodiment described above is effective also, for example, in a case that the conditions for the monitored apparatus are different between when a correlation model is generated and when the correlation model is actually operated. As one specific example, assuming a case that the correlation model is generated using data of the monitored apparatus in a steady state. When the correlation model generated as described above is applied on start-up or shut-down of the monitored apparatus, a difference between the state in which the correlation model is generated and the state in which the correlation model is applied may be erroneously detected as an anomaly (failure). For example, even when the observed value of a certain metric is a normal value in the start-up state or the shut-down state of the monitored apparatus, the value may deviate from an estimated value output from the correlation model generated in the steady state. In such a case, the anomaly state due to the erroneous detection may be continuously detected. However, the operation management apparatus 100 according to this example embodiment is able to exclude appropriately the effect of the erroneous detection. The operation management apparatus according to this example embodiment is also effective in a case where a data collection mechanism is different between when the correlation model is generated and when the correlation model is applied (e.g., when a sensor device is changed, when a conversion is performed on sensor data, and the like.).

Modified Example of First Example Embodiment

Figure 4:
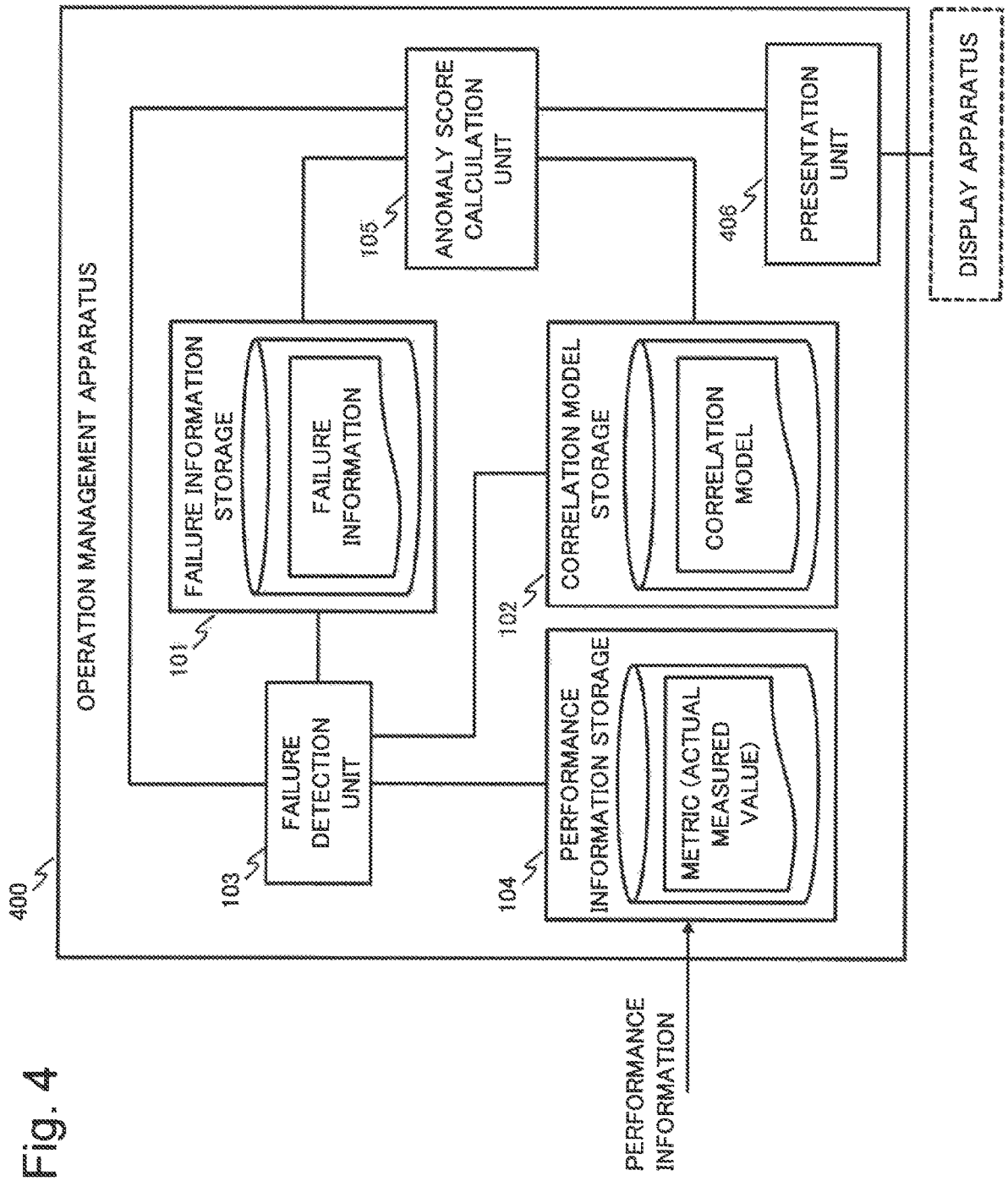
FIG. 4 is a block diagram illustrating a functional configuration of an operation management apparatus according to a modified example of the first example embodiment of the present invention.

Next, a modified example of the first example embodiment described above will be described with reference to FIG. 4. FIG. 4 is a block diagram illustrating a functional configuration of an operation management apparatus 400 according to this modified example. In the following description, components of the modified example that are similar to those of the first example embodiment described above are assigned with the same reference numbers and detailed descriptions thereof are omitted.

The operation management apparatus 400 according to this modified example further includes a presentation unit 406, in addition to the components similar to those of the operation management apparatus 100 according to the first example embodiment. In the operation management apparatus 400, components other than the presentation unit 406 may be similar to those of the first example embodiment described above, and thus detailed descriptions thereof are omitted.

The presentation unit 406 presents, to a user of the operation management apparatus 400, the anomaly score calculated by the anomaly score calculation unit 105, and the like. More specifically, the presentation unit 406 controls various display apparatuses to display a particular metric (or a combination thereof) and the anomaly score related to the metric. The display apparatuses may be apparatuses, such as a liquid crystal panel and a projector, which have a function for displaying various pieces of information for the user. Note that in the configuration illustrated in FIG. 4, the display apparatuses are arranged outside of the operation management apparatus 400. However, this modified example is not limited to that configuration. The display apparatuses may be arranged as a part of the operation management apparatus 400, or may be arranged separately from the operation management apparatus 400.

Figure 5:
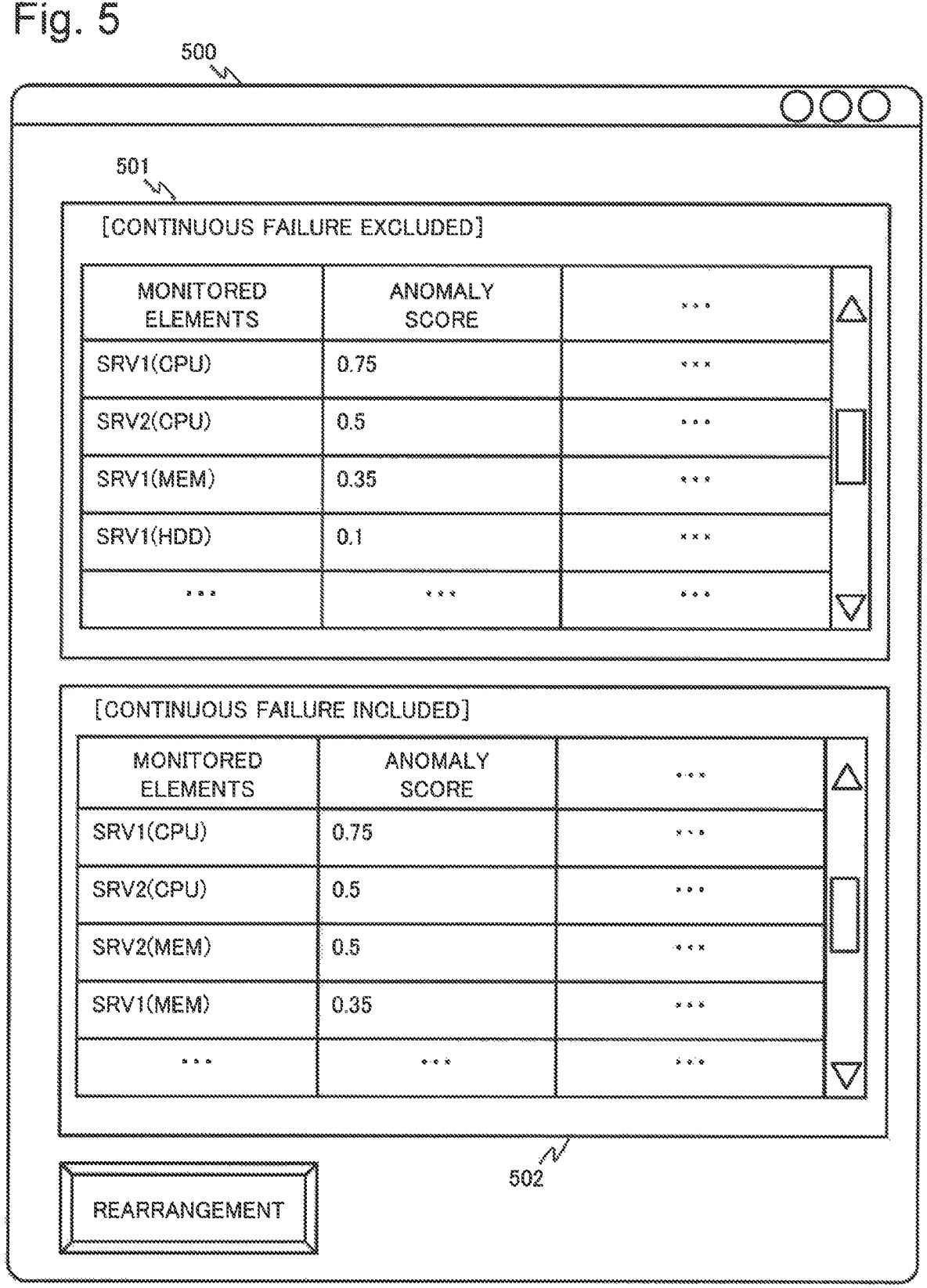
FIG. 5 is a diagram illustrating a specific example of a user interface in the modified example of the first example embodiment of the present invention.
Figure 6:
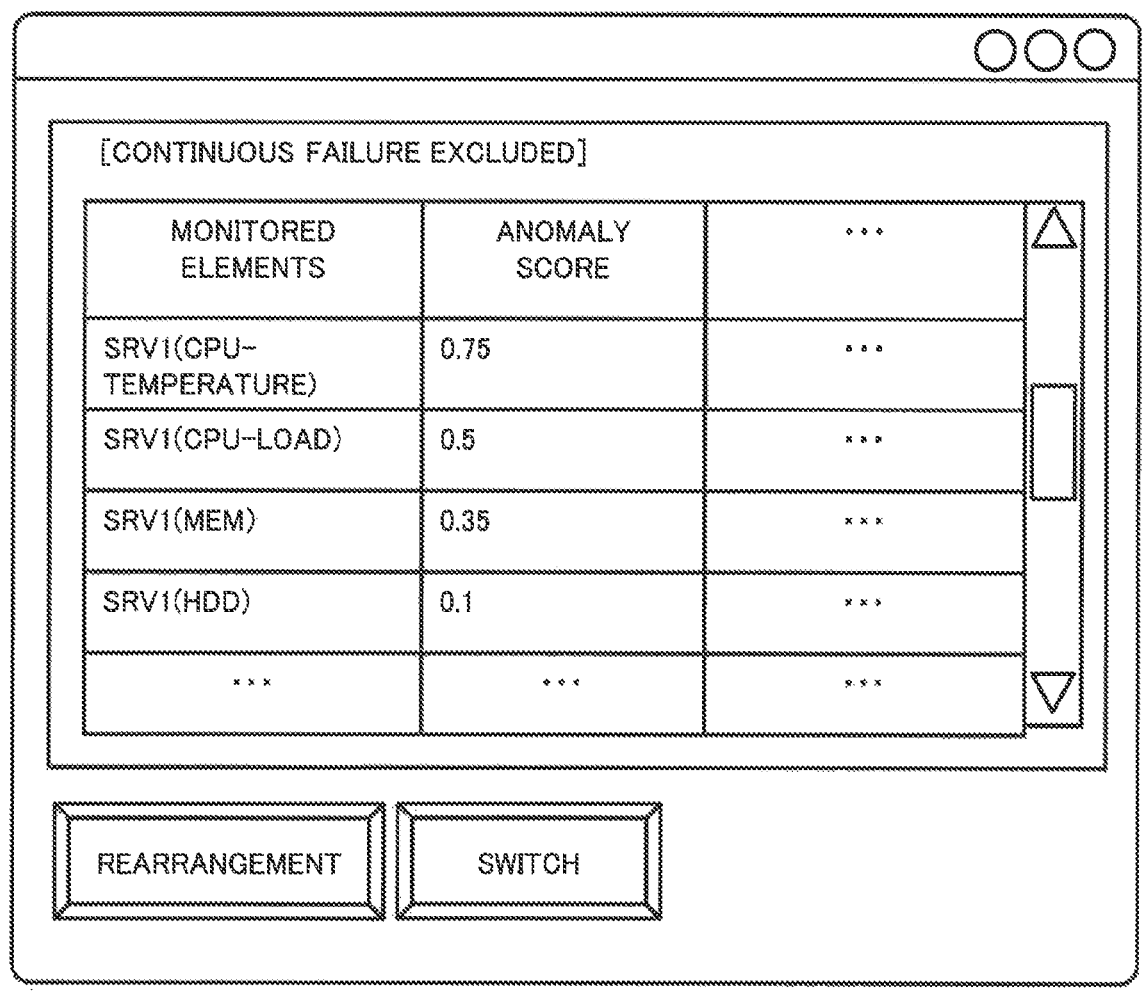
FIG. 6 is a diagram illustrating another specific example of the user interface in the modified example of the first example embodiment of the present invention.

The presentation unit 406 may generate a user interface as illustrated in, for example, FIG. 5 or FIG. 6, and may control the display apparatus so as to display the user interface. In the user interface illustrated in FIGS. 5 and 6, monitored elements (metrics) in the monitored apparatus and anomaly scores are displayed by being associated with each other.

The presentation unit 406 is able to generate a user interface for rearranging and displaying the anomaly score in accordance with a particular criterion, and to control the display apparatuses so as to display the user interface. Specifically, for example, the presentation unit 406 may generate a user interface for displaying anomaly scores in a ranking format in which the anomaly scores are rearranged in a descending order (or an ascending order). For example, when the presentation unit 406 presents, to the user, the anomaly scores calculated for metrics related to a certain monitored apparatus in the ranking format in which the values of the anomaly scores are arranged in a descending order, the user is able to find out the monitored apparatus in which a failure is likely to be occurring.

The presentation unit 406 may generate a user interface capable of displaying, for example, both the anomaly score (first anomaly score) which is calculated by eliminating effect of the continuous failure by evaluating the above-mentioned broken ratio, and the anomaly score (second anomaly score) which is calculated without evaluating the broken ratio (FIG. 5). In the user interface illustrated in FIG. 5, information about the first anomaly score is displayed in a region denoted by reference number 501, and information about the second anomaly score is displayed in a region denoted by reference number 502.

Further, the presentation unit 406 may generate a user interface in which the user can switch displaying of the first anomaly score and the second anomaly score (FIG. 6). In the user interface illustrated in FIG. 6, for example, when the user presses a "switch" button, the first anomaly score and the second anomaly score are switched and displayed. In this case, for example, when the condition in generating the correlation model is similar to the condition in applying the correlation model, the user can operate the user interface to display the first anomaly score.

The operation management apparatus 400 in this modified example configured as described above is able to present, to the user, anomaly scores rearranged based on a particular criterion. With this configuration, according to the operation management apparatus 400 in this modified example, the user can find out the monitored apparatus in which, for example, the anomaly score is large (it is considered that a failure is likely occurring). The user can also find out the monitored apparatus in which, for example, the anomaly score is small (it is highly likely that the apparatus is stably operating). Thus, the user is able to execute various management operations by, for example, giving priority to the monitored apparatus having a large anomaly score.

Further, the operation management apparatus 400 according to this modified example configured as described above is able to present both the first anomaly score and the second anomaly score to the user. With this configuration, by use of the operation management apparatus 400 according to this modified example, the user is able to switch the displayed anomaly score depending on a status (depending on a situation where the operation management apparatus 400 monitors the monitored apparatus).

As described above, the operation management apparatus 400 according to this modified example is able to improve the efficiency of various management operations performed by the user in relation to the monitored apparatus. The operation management apparatus 400 according to this modified example has a configuration similar to that of the operation management apparatus 100 according to the first example embodiment described above, and thus provides advantageous effects similar to those of the operation management apparatus 100 according to the first example embodiment described above.

Second Example Embodiment

Figure 7:
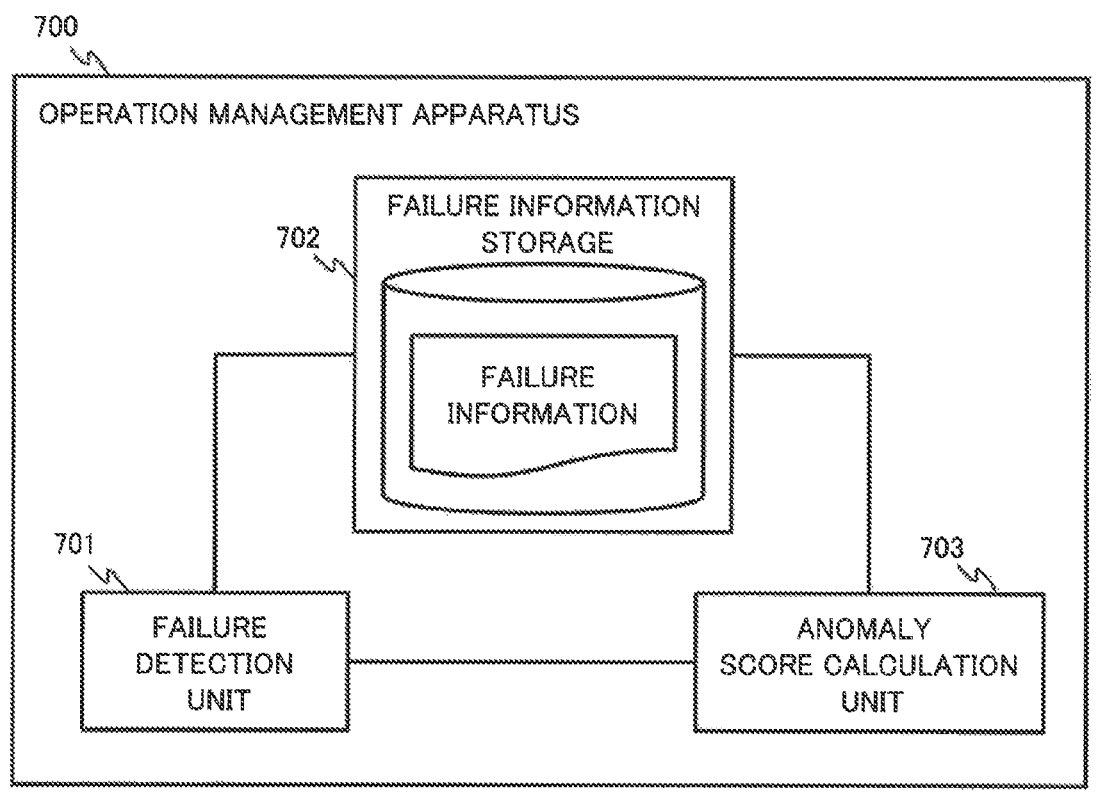
FIG. 7 is a block diagram illustrating a functional configuration of an operation management apparatus according to a second example embodiment of the present invention.

Next, a second example embodiment of the present invention will be described with reference to FIG. 7. FIG. 7 is a block diagram illustrating a functional configuration of an operation management apparatus 700 according to the second example embodiment.

As illustrated in FIG. 7, the operation management apparatus 700 according to this example embodiment includes a failure detection unit 701, a failure information storage 702, and an anomaly score calculation unit 703. These components may be connected to each other in such a manner that the components can communicate with each other by an appropriate communication method. The respective components will be described below.

The failure detection unit 701 (failure detection means) acquires one or more measured values of a performance indicator (metric) related to the monitored system (not illustrated). The monitored system may be configured by one or more monitored apparatuses. The failure detection unit 701 may acquire the measured value of the performance indicator (metric) related to the monitored apparatus constituting the monitored system. The failure detection unit 701 detects failure information about two different performance indicators based on the acquired measured value by using the correlation model representing the relationship between the two different performance indicators. The failure detection unit 701 may have a configuration similar to that of, for example, the failure detection unit 103 in each example embodiment described above.

The failure information storage 702 (failure information storage means) stores, in time series, information about the failure detected in the failure detection unit 701. The failure information storage 702 may store, as time-series data, for example, failure information about a particular combination of performance indicators (metrics) and a time when the failure information is detected, by associating the failure information and the time with each other. The failure information storage 702 may have a configuration similar to that of, for example, the failure information storage 104 in each example embodiment described above.

The anomaly score calculation unit 703 (anomaly score calculation means) determines whether or not the failure information is continuously detected for a combination including a particular performance indicator among combinations of two different performance indicators, based on the information about the failure stored in the failure information storage 702.

The anomaly score calculation unit 703 calculates an anomaly score representing a degree of anomaly related to the above-mentioned performance indicator. Specifically, the anomaly score calculation unit 703 acquires information about, for example, one or more combinations (second combinations) in which failure information is determined to be continuously detected among one or more combinations (first combinations) into which a particular performance indicator is included and in which the failure information is detected. The anomaly score calculation unit 703 acquires information about the other combinations including the particular performance indicator. Then, the anomaly score calculation unit 703 calculates the anomaly score based on the acquired information described above. The information about the above-mentioned combination may be, for example, information about the number of the combinations.

The anomaly score calculation unit 703 may have a configuration similar to that of, for example, the anomaly score calculation unit 105 in each example embodiment described above.

In the operation management apparatus 700 according to this example embodiment configured as described above, the anomaly score calculation unit 703 evaluates whether the failure is continuously occurring by referring to the failure information storage 702, when the anomaly score calculation unit 703 calculates the anomaly score. Specifically, the operation management apparatus 700 according to this example embodiment is configured to detect the anomaly related to the monitored system by evaluating a temporal change in the state of the monitored system.

With this configuration, the operation management apparatus 700 is able to detect the anomaly in the monitored system, even when the anomaly state is steadily detected regardless of whether the anomaly is actually occurring in relation to a particular combination of performance indicators (metrics). More specifically, when a state detected for the particular combination of performance indicators (metrics) is changed from the normal state to the anomaly state, the operation management apparatus 700 is able to detect occurrence of the anomaly in the monitored system and is able to appropriately specify an anomaly part. As described above, the operation management apparatus 700 according to this example embodiment is able to supply information which can be used for determining whether the anomaly (failure) is actually occurring in the monitored system in the status where the particular anomaly (failure) state related to the monitored system is continuously detected.

Third Example Embodiment

Figure 8:
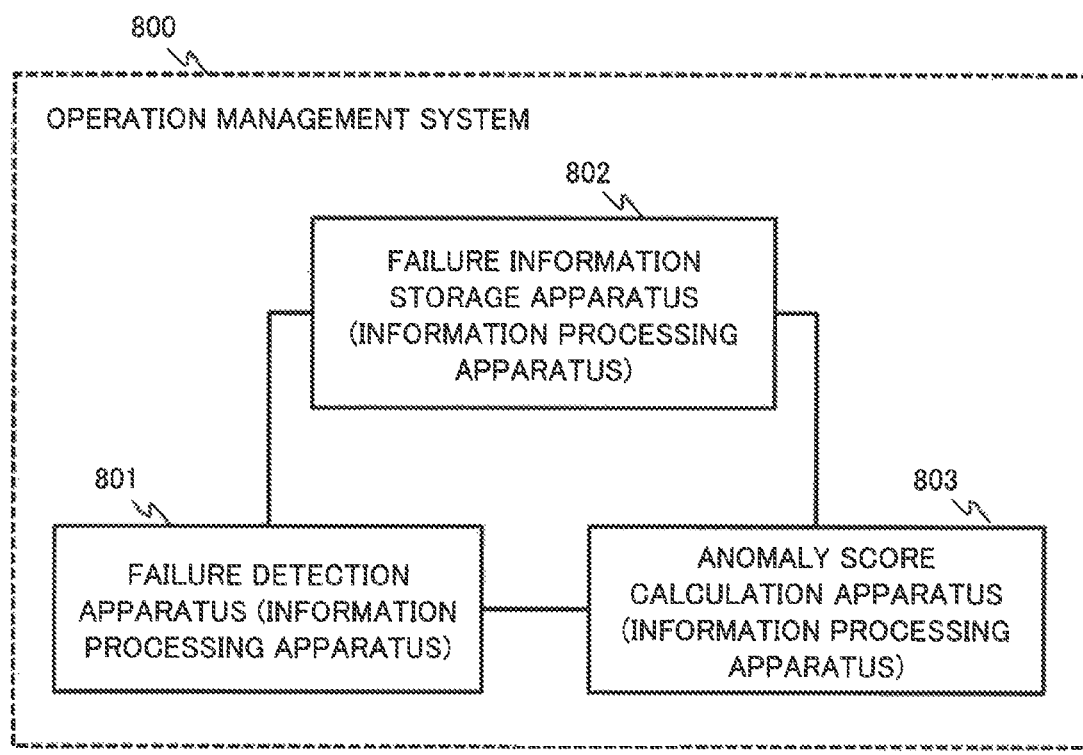
FIG. 8 is a block diagram illustrating a functional configuration of an operation management apparatus according to a third example embodiment of the present invention.

Next, a third example embodiment of the present invention will be described with reference to FIG. 8. FIG. 8 is a block diagram illustrating a functional configuration of an operation management system 800 according to the third example embodiment.

As illustrated in FIG. 8, the operation management system 800 according to this example embodiment includes a failure detection apparatus 801, a failure information storage apparatus 802, and an anomaly score calculation apparatus 803. These components may be communicatively connected to each other by using an appropriate communication method. The operation management system 800 having a configuration as described above can be implemented as a system in which, for example, the components of the operation management apparatus 700 according to the second example embodiment described above are implemented by a single information processing apparatus (a computer and the like) and connected to each other.

That is, the failure detection apparatus 801 is any information processing apparatus, such as a computer, which is able to implement the functions of the failure detection unit 103 or the failure detection unit 701 in each of the example embodiments described above, for example.

The failure information storage apparatus 802 is any information processing apparatus, such as a computer, which can implement the functions of the failure information storage 104 or the failure information storage 702 in each of the example embodiments described above.

The anomaly score calculation apparatus 803 is any information processing apparatus, such as a computer, which can implement the functions of the anomaly score calculation unit 105 or the anomaly score calculation unit 703 in each of the example embodiments described above, for example.

In the operation management system 800 in this example embodiment configured as described above, like in the above example embodiments, the anomaly score calculation apparatus 803 evaluates whether the failure is continuously occurring by referring to the failure information storage apparatus 802, when the anomaly score calculation apparatus 803 calculates an anomaly score. Specifically, the operation management system 800 according to this example embodiment is configured to detect the anomaly related to the monitored system by evaluating a temporal change in the state of the monitored system.

With this configuration, the operation management system 800 is able to detect the anomaly in the monitored system, even when the anomaly state is steadily detected regardless of whether the anomaly is actually occurring in relation to a particular combination of performance indicators (metrics). More specifically, when a state detected for the particular combination of performance indicators (metrics) is changed from the normal state to the anomaly state, the operation management system 800 is able to detect occurrence of the anomaly in the monitored system and can appropriately specify an anomaly part. As described above, according to the operation management system 800 according to this example embodiment, it is possible to provide information which can be used for determining whether the anomaly (failure) is actually occurring in the monitored system in the status where the particular anomaly (failure) state related to the monitored system is continuously detected.

Note that in the above description, each of the failure detection apparatus 801, the failure information storage apparatus 802, and the anomaly score calculation apparatus 803 is configured a single information processing apparatus. However, this example embodiment is not limited to this configuration. That is, two or more of the components constituting the operation management system 800 may be implemented by the same information processing apparatus. The information processing apparatus may be such as a physical computer, or a virtual information processing apparatus implemented using a virtualization technique generally used recently. The information processing apparatus may be implemented by a hardware configuration illustrated in FIG. 9.

Configurations of Hardware and Software Programs (Computer Programs)

A hardware configuration capable of implementing each example embodiment described above will be described below.

In the following description, the operation management apparatuses (100, 700) described above in each of the example embodiments are collectively referred to simply as an "operation management apparatus". The components (the performance information storage 101, the correlation model storage 102, the failure detection unit (103, 701), the failure information storage (104, 702), the anomaly score calculation unit (105, 703), and the presentation unit 406) of the operation management apparatus are referred to simply as "components of the operation management apparatus".

The operation management apparatus described above in each of the example embodiments may be configured using a dedicated hardware apparatus. In this case, each of the components illustrated in the drawings may be implemented as hardware in which a part or the whole of the components are integrated (an integrated circuit having a processing logic mounted thereon, and the like).

For example, when the components are implemented using hardware, an integrated circuit capable of realizing the functions of the components may be implemented by use of an SoC (System on a Chip) or the like. In this case, for example, data to be stored in each component may be stored in a RAM (Random Access Memory) area and a flash memory area which are integrated as the SoC.

In this case, known communication buses may be adopted as communication lines for connecting the components. The communication lines for connecting the components are not limited to bus connections, but the components may be connected by peer-to-peer connection.

Figure 9:
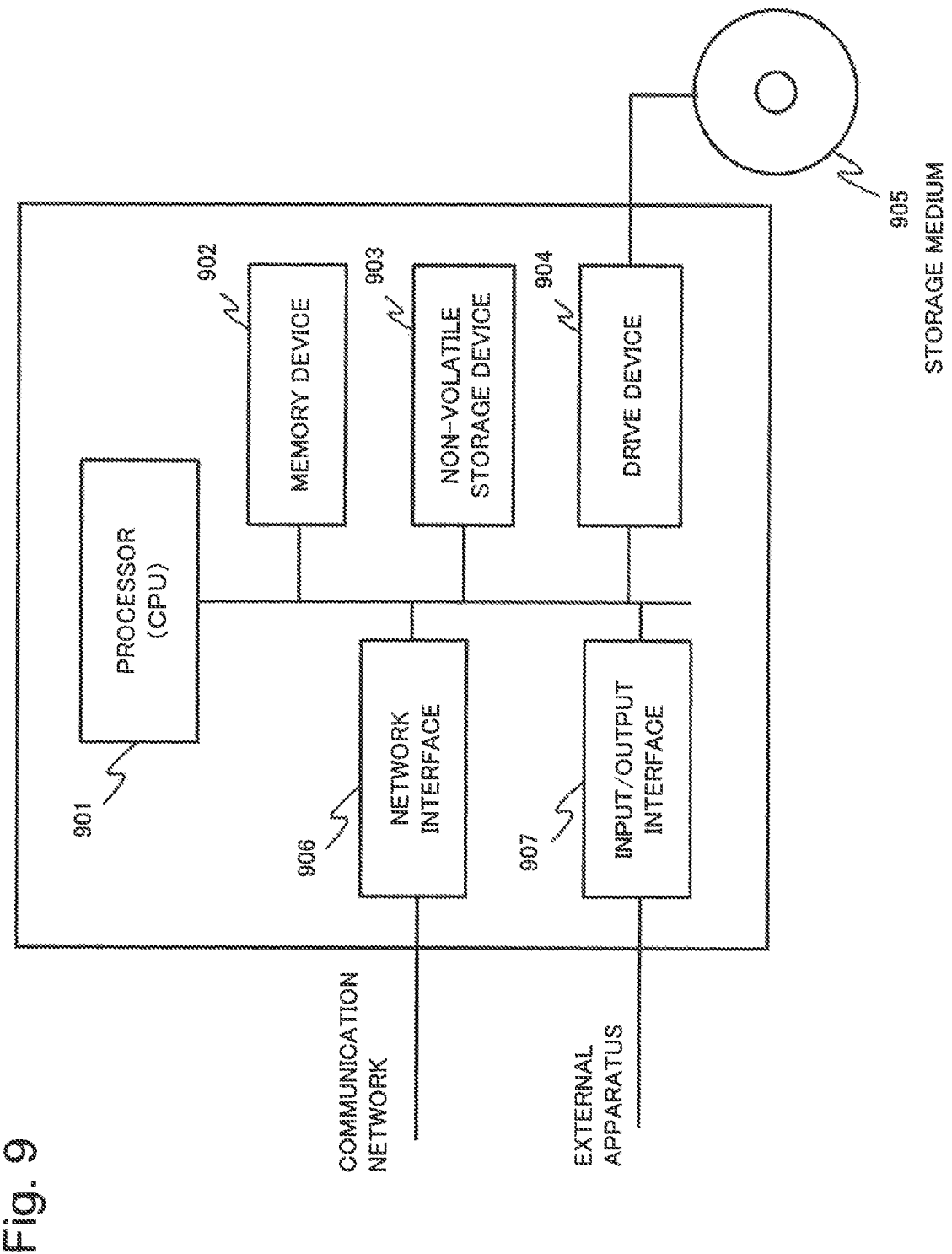
FIG. 9 is a diagram illustrating a hardware configuration capable of implementing operation management apparatuses according to example embodiments of the present invention.

The operation management apparatus described above may be configured using general-purpose hardware as illustrated in FIG. 9 and various software programs (computer programs) executed by the hardware.

A processor 901 illustrated in FIG. 9 is an operational processing unit such as a general-purpose CPU (Central Processing Unit) or a microprocessor. The processor 901 may read various software programs stored in, for example, a non-volatile storage device 903, which is described later, into a memory device 902, and may execute processing in accordance with the software programs. For example, the components of the operation management apparatus in each of the example embodiments described above may be implemented as a software program executed by the processor 901.

The memory device 902 is a memory device, such as a RAM, which can be referred to by the processor 901, and stores software programs, various data, and the like. Note that the memory device 902 may be a volatile memory device.

The non-volatile storage device 903 is a non-volatile storage such as a magnetic disk drive and a semiconductor memory device using a flash memory. The non-volatile storage device 903 is able to store various software programs, data, and the like.

A network interface 906 is an interface device connected to a communication network. For example, an interface device for wired and wireless LAN (Local Area Network) connections may be applied.

A drive device 904 is, for example, a device for executing processing of reading data from a storage medium 905, which is described later, or writing data thereto.

The storage medium 905 is any storage medium capable of recording data, such as an optical disk, a magneto-optical disk, or a semiconductor flash memory.

An input/output interface 907 is a device that controls input of data into an external device and output of data from the external device.

The operation management apparatus according to the present invention described above with reference to the example embodiments may be configured using, for example, the hardware apparatus illustrated in FIG. 9. Similarly, the components of the operation management system 800 described above may be also configured using, for example, the hardware apparatus illustrated in FIG. 9. In this case, the present invention may be implemented by supplying the hardware apparatus with a software program capable of implementing the functions described in the above example embodiments. More specifically, for example, the present invention may be implemented by causing the processor 901 to execute the software program supplied to the apparatus.

In the example embodiments described above, each part illustrated in the drawings (e.g., FIGS. 1, 4, and 7) described above can be implemented as a software module which is a function (processing) unit of the software program executed by the above-mentioned hardware. In this case, however, the division of software modules illustrated in the drawings is only for convenience of explanation, and various configurations can be assumed when the components are implemented.

For example, when each of the parts described above is implemented as a software module, the software modules may be stored in the non-volatile storage device 903. When the processor 901 executes each processing, the processor 901 may read the software modules into the memory device 902.

These software modules may be configured to mutually transmit various data by use of an appropriate method such as a shared memory or an inter-process communication. With this configuration, these software modules can be communicatively connected to each other.

In addition, the above-mentioned software programs may be recorded in the storage medium 905. In this case, the above-mentioned software programs may be appropriately stored in the non-volatile storage device 903 through the drive device 904, in a shipment stage or an operation stage of the above-mentioned communication apparatus and the like.

In the above-mentioned case, as a method for supplying various software programs to the operation management apparatus described above, a method of installing various software programs into the apparatus using an appropriate tool, may be used in a manufacturing stage before shipment, in a maintenance stage after shipment, or the like. Further, a method that is generally used nowadays, such as a method of downloading various software programs from the outside via a communication line such as the Internet, may be used as the method for supplying various software programs.

In such a case, it can be understood that the present invention is configured by use of a code constituting the software program, or a computer-readable storage medium recording the code.

The operation management apparatus described above or the components of the operation management apparatus may be configured using a virtualized environment obtained by virtualizing the hardware apparatus illustrated in FIG. 9, and various software programs (computer programs) executed in the virtualized environment. In this case, the components of the hardware apparatus illustrated in FIG. 9 are realized as virtual devices in the virtualized environment. In this case, also, the present invention can be implemented using a configuration similar to the configuration when the hardware apparatus illustrated in FIG. 9 is configured as a physical apparatus.

Similarly, the components of the operation management system 800 described above can also be implemented using a virtualized environment obtained by virtualizing the hardware apparatus illustrated in FIG. 9 and various software programs (computer programs) executed in the virtualized embodiment.

As described above, the present invention is explained by use of examples shown as exemplary embodiments in which the present invention is applied. However, the technical scope of the present invention is not limited to the example embodiments described above. In other words, the present invention is applicable to various embodiments that can be understood by those skilled in the art within the scope of the present invention. It is obvious to those skilled in the art that various changes or improvements can be made to the example embodiments. In this case, new example embodiments obtained by making the changes or improvements are also included in the technical scope of the present invention. Further, example embodiments obtained by combining the above-described example embodiments or new example embodiments obtained by making the changes or improvements are also included in the technical scope of the present invention. This is obvious from the matters described in the scope of claims. This application is based upon and claims the benefit of priority from Japanese patent application No. 2014-259158, filed on Dec. 22, 2014, the disclosure of which is incorporated herein in its entirety by reference.

REFERENCE SIGNS LIST

100 Operation management apparatus
101 Performance information storage
102 Correlation model storage
103 Failure detection unit
104 Failure information storage
105 Anomaly score calculation unit
406 Presentation unit
700 Operation management apparatus
701 Failure detection unit
702 Failure information storage
703 Anomaly score calculation unit
901 Processor
902 Memory device
903 Non-volatile storage device
904 Drive device
905 Storage medium
906 Network interface
907 Input/output interface

The invention claimed is:

1. An operation management apparatus comprising:
at least one memory configured to store instructions; and
at least one processor configured to execute the instructions, to perform:
acquiring one or more measured values for a plurality of performance indicators with regard to a monitored system;
detecting failure information indicating a failure with regard to first combinations of the performance indicators including a particular performance indicator, based on the measured values being acquired, by using a correlation model representing a relationship between at least two of the performance indicators;
storing the detected failure information in time series in a memory device;
determining one or more second combinations, among the first combinations and based on the failure information stored in the memory device, of the plurality of different performance indicators as being continuously detected;
calculating a difference obtained by subtracting a quantity of the one or more second combinations from a quantity of first combinations;
calculating a first anomaly score representing a degree of an anomaly with regard to the particular performance indicator, based on a ratio between the calculated difference and the quantity of the first combinations including the particular performance indicator; and
providing the first anomaly score being calculated.

2. The operation management apparatus according to claim 1, wherein the at least one processor is further configured to execute the instructions to perform:
calculating, for the first combinations including the particular performance indicator, a ratio of the number of pieces of the failure information detected during a first period to the number of the measured values acquired during the first period; and
determining that the failure information about the first combinations including the particular performance indicator is continuously detected when the calculated ratio exceeds a reference.

3. The operation management apparatus according to claim 2, wherein the at least one processor is further configured to execute the instructions to perform:
presenting anomaly points related to the performance indicator included in the first combinations for which the first anomaly score is calculated, in a descending order of the first anomaly score being calculated.

4. The operation management apparatus according to claim 2, wherein
the correlation model includes a conversion function representing a correlation between a first performance indicator and a second performance indicator, the first performance indicator and the second performance indicator being included in the first combinations, and
wherein the at least one processor is further configured to execute the instructions to perform:
calculating a difference between an estimated value for the second performance indicator that is obtained by applying the conversion function to a measured value for the first performance indicator included in the measured value acquired, and a measured value for the second performance indicator included in the measured value acquired; and
detecting a failure related to the first performance indicator and the second performance indicator when the calculated difference or a value proportional to the difference exceeds a reference.

5. The operation management apparatus according to claim 1, wherein the at least one processor is further configured to execute the instructions to perform:
calculating, for the first combinations including the particular performance indicator, a ratio of the number of pieces of the failure information continuously detected during a second period included in a first period to the number of the measured values acquired during the first period; and
determining that the failure information about the first combinations including the particular performance indicator is continuously detected, when the calculated ratio exceeds a reference.

6. The operation management apparatus according to claim 5, wherein the at least one processor is further configured to execute the instructions to perform:
presenting anomaly points related to the performance indicator included in the first combinations for which the first anomaly score is calculated, in a descending order of the first anomaly score being calculated.

7. The operation management apparatus according to claim 5, wherein
the correlation model includes a conversion function representing a correlation between a first performance indicator and a second performance indicator, the first performance indicator and the second performance indicator being included in the first combinations, and
wherein the at least one processor is further configured to execute the instructions to perform:
calculating a difference between an estimated value for the second performance indicator that is obtained by applying the conversion function to a measured value for the first performance indicator included in the measured value acquired, and a measured value for the second performance indicator included in the measured value acquired; and detecting a failure related to the first performance indicator and the second performance indicator when the calculated difference or a value proportional to the difference exceeds a reference.

8. The operation management apparatus according to claim 1, wherein the at least one processor is further configured to execute the instructions to perform:

determining, for the first combinations including the particular performance indicator, whether the failure information about the first combinations is continuously detected, based on the failure information stored in the memory device; and when determining that the failure information is continuously detected, calculating a difference obtained by subtracting the quantity of the one or more second combinations from the number quantity of the first combinations, calculating the first anomaly score, and calculating a second anomaly score based on a ratio between the quantity of the first combinations and a quantity comprising at least one other combination including the particular performance indicator.

9. The operation management apparatus according to claim 8, wherein the at least one processor is further configured to execute the instructions to perform:

presenting anomaly points related to the performance indicator included in the first combinations for which the first anomaly score or the second anomaly score is calculated, by switching either in a descending order of the first anomaly score being calculated, or in a descending order of the second anomaly score being calculated.

10. The operation management apparatus according to claim 9, wherein the correlation model includes a conversion function representing a correlation between a first performance indicator and a second performance indicator, the first performance indicator and the second performance indicator being included in the first combinations, and wherein the at least one processor is further configured to execute the instructions to perform:

calculating a difference between an estimated value for the second performance indicator that is obtained by applying the conversion function to a measured value for the first performance indicator included in the measured value acquired, and a measured value for the second performance indicator included in the measured value acquired; and detecting a failure related to the first performance indicator and the second performance indicator when the calculated difference or a value proportional to the difference exceeds a reference.

11. The operation management apparatus according to claim 8, wherein the at least one processor is further configured to execute the instructions to perform:

presenting anomaly points related to the performance indicator included in the first combinations for which the first anomaly score is calculated, in a descending order of the first anomaly score being calculated.

12. The operation management apparatus according to claim 8, wherein the correlation model includes a conversion function representing a correlation between a first performance indicator and a second performance indicator, the first performance indicator and the second performance indicator being included in the first combinations, and wherein the at least one processor is further configured to execute the instructions to perform:

calculating a difference between an estimated value for the second performance indicator that is obtained by applying the conversion function to a measured value for the first performance indicator included in the measured value acquired, and a measured value for the second performance indicator included in the measured value acquired; and detecting a failure related to the first performance indicator and the second performance indicator when the calculated difference or a value proportional to the difference exceeds a reference.

13. The operation management apparatus according to claim 1, wherein the at least one processor is further configured to execute the instructions to perform:

presenting anomaly points related to the performance indicator included in the first combinations for which the first anomaly score is calculated, in a descending order of the first anomaly score being calculated.

14. The operation management apparatus according to claim 13, wherein the correlation model includes a conversion function representing a correlation between a first performance indicator and a second performance indicator, the first performance indicator and the second performance indicator being included in the first combinations, and wherein the at least one processor is further configured to execute the instructions to perform:

calculating a difference between an estimated value for the second performance indicator that is obtained by applying the conversion function to a measured value for the first performance indicator included in the measured value acquired, and a measured value for the second performance indicator included in the measured value acquired; and detecting a failure related to the first performance indicator and the second performance indicator when the calculated difference or a value proportional to the difference exceeds a reference.

15. The operation management apparatus according to claim 1, wherein the correlation model includes a conversion function representing a correlation between a first performance indicator and a second performance indicator, the first performance indicator and the second performance indicator being included in the first combinations, and wherein the at least one processor is further configured to execute the instructions to perform:

calculating a difference between an estimated value for the second performance indicator that is obtained by applying the conversion function to a measured value for the first performance indicator included in the measured value acquired, and a measured value for the second performance indicator included in the measured value acquired; and detecting a failure related to the first performance indicator and the second performance indicator when the calculated difference or a value proportional to the difference exceeds a reference.

16. The operation management apparatus according to claim 1, wherein the at least one processor is further configured to execute the instructions to perform:

presenting anomaly points related to the performance indicator included in the first combinations for which the first anomaly score is calculated, in a descending order of the first anomaly score being calculated.

17. An operation management method comprising, by an information processing apparatus:
   acquiring one or more measured values for a plurality of performance indicators with regard to a monitored system;
   detecting failure information indicating a failure with regard to first combinations of the performance indicators including a particular performance indicator, based on the measured values being acquired, by using a correlation model representing a relationship between at least two of the performance indicators;
   storing the detected failure information in time series;
   determining one or more second combinations among the first combinations and based on the failure information, of the plurality of different performance indicators as being continuously detected;
   calculating a difference obtained by subtracting a quantity of the one or more second combinations from a quantity of the first combinations; and
   calculating an anomaly score representing a degree of an anomaly with regard to the particular performance indicator, based on a ratio between the calculated difference and the quantity of the first combinations including the particular performance indicator.

18. A non-transitory computer-readable storage medium configured to store at least one computer program for causing at least one computer to execute a method comprising:
   acquiring one or more measured values for a plurality of performance indicators with regard to a monitored system;
   detecting failure information indicating a failure with regard to first combinations of the performance indicators including a particular performance indicator, based on the measured values being acquired, by using a correlation model representing a relationship between at least two of the performance indicators;
   storing the detected failure information in time series;
   determining one or more second combinations among the first combinations and based on the failure information, of the plurality of different performance indicators as being continuously detected;
   calculating a difference obtained by subtracting a quantity of the one or more second combinations from a quantity of the first combinations; and
   calculating a first anomaly score representing a degree of an anomaly with regard to the particular performance indicator, based on a ratio between the calculated difference and the quantity of the first combinations including the particular performance indicator.

* * * * *

UNITED STATES PATENT AND TRADEMARK OFFICE
CERTIFICATE OF CORRECTION

PATENT NO.        : 10,719,380 B2
APPLICATION NO.   : 15/535785
DATED             : July 21, 2020
INVENTOR(S)       : Kiyokazu Miki and Masanao Natsumeda Page 1 of 1

It is certified that error appears in the above-identified patent and that said Letters Patent is hereby corrected as shown below:

In the Specification

Column 8, Description of Embodiments, Line 35; Before "monitored", delete "measures to be"

Column 9, Description of Embodiments, Line 10; Delete ""I"" and insert --"/"-- therefor In the Claims Column 23, Line 22; In Claim 17, after "from a", insert --number--

Signed and Sealed this
Eighth Day of December, 2020

Andrei Iancu
*Director of the United States Patent and Trademark Office*